United States Patent Office 2,795,381
Patented June 11, 1957

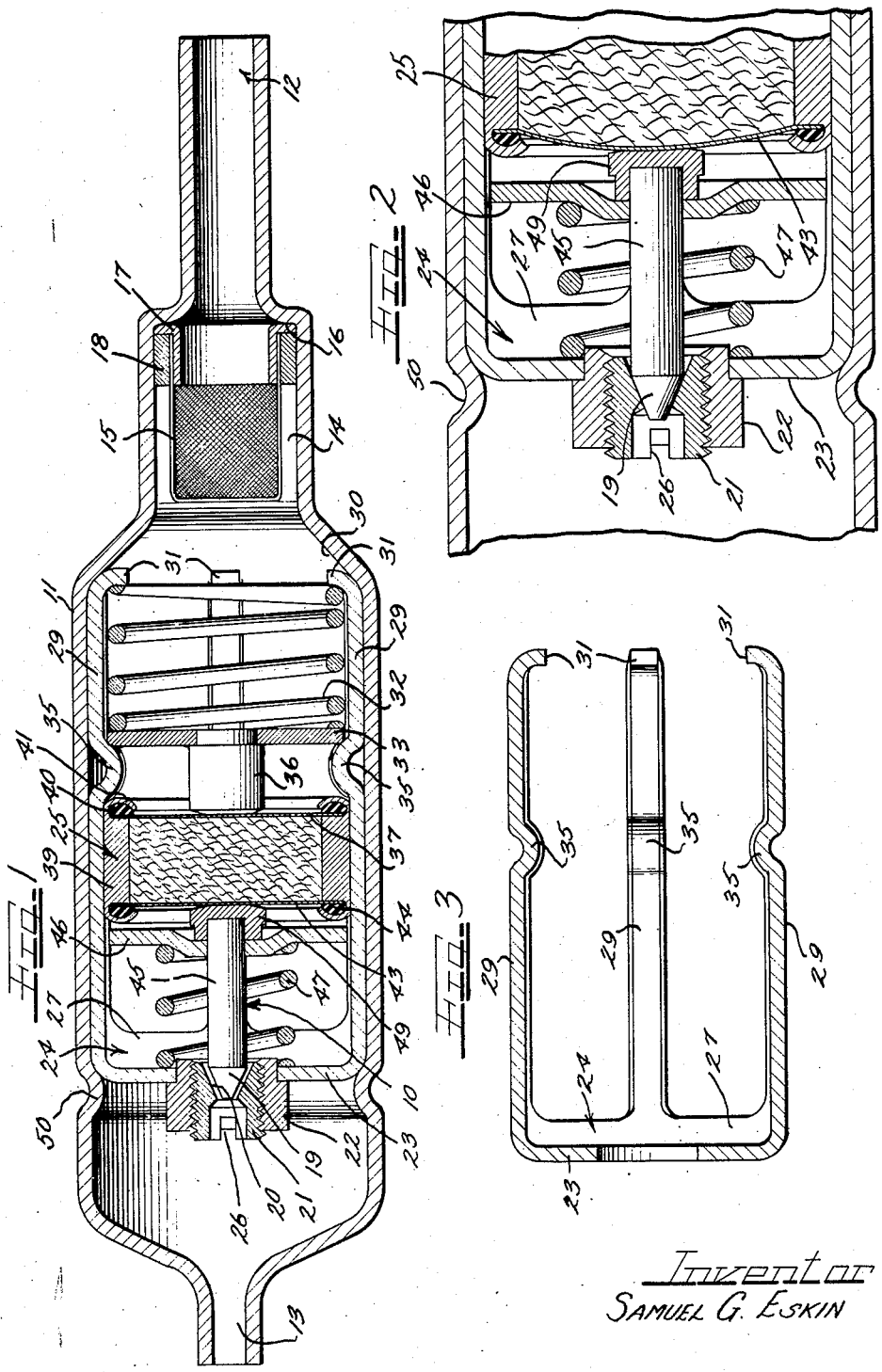

2,795,381

LIQUID REGULATING VALVE

Samuel G. Eskin, Chicago, Ill., assignor to The Dole Valve Company, Chicago, Ill., a corporation of Illinois Application February 9, 1956, Serial No. 564,413

4 Claims. (Cl. 236—93)

This invention relates to improvements in fluid regulating valves for regulating the flow of fluid in accordance with the temperature of the fluid.

A principal object of the invention is to provide a simple and improved form of valve for regulating the flow of fluid in accordance with the temperature thereof.

A further object of the invention is to provide a new and improved fluid regulating valve of a simple and inexpensive construction for metering fluid in accordance with the temperature of the fluid.

Still another object of the invention is to provide a fluid regulating valve of a simple and novel construction and arrangement in which a thermal element is arranged for direct contact with the fluid flowing through the valve and is supported in the valve casing to accommodate the flow of fluid around the thermal element with a minimum amount of interference to the flow of fluid through the valve.

A further object of the invention is to provide an improved form of fluid regulating valve in which the valve casing may be formed from a tube and has a thermal element contained therein for direct contact with the fluid flowing through the valve, and in which a novel support for the thermal element is provided, accommodating the flow of fluid around the thermal element and so arranged as not to interfere with the flow of fluid through the valve.

A still further object of the invention is to provide a simple and inexpensive form of fluid regulating valve in which the casing of the valve is made from tubing reduced in diameter at its ends and in which the thermal element is in the form of a cylindrical casing closed at its ends by flexible metal diaphragm containing a fusible thermally expansible material within the casing and in which the thermal element valve and orifice are maintained within the casing by forming the casing to a retainer for the valve, orifice and thermal element.

These and other objects of the invention will appear from time to time as the following specification proceeds and with reference to the accompanying drawings wherein:

Figure 1 is a longitudinal sectional view taken through a valve constructed in accordance with the invention;

Figure 2 is an enlarged view of the valve shown in Figure 1, showing the valve in its closed position; and Figure 3 is a longitudinal sectional view taken through the cage for the thermal element, valve and orifice member.

In Figure 1 of the drawings, I have shown a thermally operated fluid regulating valve 10 contained within a casing 11 which may be formed from metal tubing preferably made from a material which will not be effected by the corrosive action of the fluid passing through the valve casing.

The valve casing 11 has an inlet 12 at one end thereof and an outlet 13 leading from the opposite end thereof. The inlet 12 and outlet 13 are shown as being of reduced diameters from the diameter of the casing 11 and may be formed by spinning or otherwise reducing the opposite ends of the cylindrical tube to the form shown, the outlet end of the valve being formed after assembly of the valve 10 within the casing.

The inlet 12 is shown as having communication with a chamber 14 for a screen 15. The chamber 14 is of a larger diameter than the inlet 12 but of a smaller diameter than the diameter of the casing 11 and the junction between the chamber 14 and inlet 12 forms a shoulder 16 abutted by the flange of a flanged retainer 17 for the screen 15. The screen 15 is shown as being generally cylindrical in form with screening extending across the inner end thereof. The screen extends about the outer wall of the retainer 17 and is retained thereto by a ring 18 which may be pressed within the chamber 14.

The valve 10 has a tapered valve face 19 shown as extending within a tapered orifice 20 formed in orifice member 21 adjustably threaded within an orifice support 22 carried in a bottom 23 of a cage 24 for said valve and for a thermal-sensitive element 25 for operating said valve. The outer end of the orifice member 21 is slotted as indicated by reference character 26, to accommodate adjustment of the orifice along the valve face by a screw driver or like tool, which may be inserted through the outlet for the valve.

The cage 24 fits snugly within the valve casing 11 and has a wall 27 extending along the inner wall of the valve casing 11 toward the inlet 12 for a short portion of the length of said valve casing. A plurality of stakes 29 extend from the wall 27 along the interior wall of the valve casing 11 to a converging wall 30 of said casing, converging to the screen chamber 14, and are turned inwardly at their ends to extend inwardly along said converging wall as indicated by reference character 31, and form a retainer and seat for an overtravel spring 32 for the thermal element 25. The inner end of the spring 32 is seated against a disk 33 guided between the stakes 29 for limited movement therealong and biased by the spring 32 into engagement with inwardly pressed ribs 35 formed in the stakes 29 and forming a stop for said disk. The disk 33 has an abutment member 36 pressed or otherwise secured thereto and extending therefrom beyond the ribs 35 into engagement with a flexible metal diaphragm 37, closing one end of a cylindrical casing 39 for the thermal element 25.

The thermal element 25 is shown as being a well known form of wax or power type of thermal element in which a wax alone, a wax, a powdered metal heat conductor and a binder or a wax and a metal wool form the motive power of the thermal element upon fusion thereof. The thermally expansible material is retained within the casing 39 by the metal diaphragm 37, sealed thereto by an annular seal 40 retained in engagement with the diaphragm 37 by the spinning or folding of a reduced cross sectional area portion 41 of the casing thereover, and by a metal diaphragm 43 closing the opposite end of the casing 39 from the diaphragm 37 and sealed thereto by an annular seal 44 retained in engagement with said diaphragm in the same manner that the seal 40 is retained into engagement with the diaphragm 37.

Upon fusion of the fusible material contained within the casing 39 at the operating range of the thermal element, the two diaphragms 37 and 43 will be extended with respect to the casing 39, to effect movement of the tapered face 19 of the valve 10 within the orifice 20 and to close said orifice upon extreme temperature conditions, as shown in Figure 2.

The valve 10 includes a valve stem 45 extending from the tapered valve face 19 toward the diaphragm 43 through a guide disk and seating member 46 for a return spring 47 for the valve and thermal element. The stem 45 is shown as having an enlarged head 49 on its inner end engaged at one side by the guide disk 46 and engaged at its opposite side with the diaphragm 43 by the spring 47. The disk 46 is guided for movement along the stakes 29 and forms a guide for the valve 10 as well as a seat for the return spring 47.

In assembling the valve, the orifice support 22 and orifice member 21 may first be assembled to the bottom 23 of the cage 24. The return spring 47, disk 46 and valve 10 may then be placed into position along the stakes 29, it being understood that during this stage of the assembly the inturned ribs 35 have not yet been formed and that the ends of the stakes have not yet been inwardly turned. The thermal element 25 may then be slidably moved along the stakes 29 and retained in position between said stakes by the formation of the ribs 35 therein, limiting movement of the thermal element toward the inlet 12 but accommodating movement thereof toward the outlet 13 upon extensible movement of the disks 43 and 37 with respect to the casing 39. The disk 33, abutment member 36 and overtravel spring 32 may then be placed in position between the stakes 29, the spring 32 being held to the desired state of compression and the stakes 31 being turned inwardly over the outer end coil of the spring to form a seat therefor and to retain the spring in position within the cage 24.

At this stage of the assembly, the outlet end of the housing 11 has not yet been formed and the diameter of the housing is uniform from the converging wall 30 to the outlet end thereof. The screen 15 having been placed in position in the screen chamber 14 and maintained in position by the ring 18 pressed therein, the cage with the valve and thermal element assembly contained therein may then be inserted in position along the inner wall of the housing 11 until the inturned ends 31 of the stakes 29 come into engagement with the converging wall 30, it being understood that the fit between the wall 27 of the cage 24 and the inner wall of the housing 11 is a relatively tight fit and may even be a press fit, to avoid leakage around said cage.

A bead 50 may then be formed in the inner wall of the housing 11 into engagement with the end of the cage 24 to retain said cage and its thermal element and valve assembly in position within the housing. The outlet end of the housing 13 may then be formed by a spinning or other forming operation to converge the outlet end of said housing to the reduced diameter outlet passageway 13.

It may here be seen that when the valve and thermal element are assembled to the cage 24 and retained within the housing 11, as shown in Figure 1, that fluid entering inlet 12 of the valve will come in direct engagement with the thermal element 25 and flow therearound between the stakes 29 and out the orifice 20 under the control of the tapered metering valve 19. As the temperature of the fluid increases to the fusion range of the fusible thermally expansible material contained within the casing 39, the diaphragms 37 and 43 will extensibly move with respect to the casing 39. The over-travel spring 32 is relatively strong compared with the return spring 47 to provide a solid abutment for the diaphragm 37 against the abutment member 36 up to the loading of the over-travel spring 32. As the diaphragm 37 is extended from the casing 39, the reaction of said diaphragm against the abutment member 36 will cause the thermal element 25 to move along the stakes 29 toward the orifice member 21. This movement, together with extensible movement of the diaphragm 43 with respect to the casing 39 will move the tapered metering face 19 of the valve 10 inwardly along the tapered orifice 20 and restrict the cross sectional flow area of said orifice upon temperature increases, entirely closing said orifice upon extreme temperature conditions, as shown in Figure 2. When a condition occurs where the tapered valve face closes the orifice 20 and the diaphragms 43 and 37 continue to be extended from the casing 39, the over-travel spring 32 will then yield, accommodating travel of the thermal element toward the ribs 35 and thus preventing damage to the thermal element as well as the valve face 19 and orifice 20.

It may thus be seen that an extremely simple flow regulating valve has been provided which regulates the flow of fluid in accordance with temperature and that the simplicity and efficiency of this valve is attained by the flow of the fluid around the thermal element and through the valve in axial alignment with the center of the housing with no restriction. It may further be seen that the fluid intimately contacts the thermal element giving an accurate sensing of changes in temperature of the fluid, and flows directly out through the orifice 20 under control of the tapered metering face 19 of the valve, and that the valve may be so calibrated as to provide a constant flow where the fluid is of a material, the viscosity of which materially changes upon temperature rises of the fluid.

It may be further seen that the simplicity, efficiency and low cost of the valve of my invention is further attained by so constructing the valve that the housing 11 may be formed from a tube and the cage for the valve and thermal element may be formed from a sheet material formed by a stamping operation and by retaining the cage, valve and thermal element to the housing by the forming of the tube into engagement therewith.

It will be understood that modifications and variations of the present invention may be effected without departing from the spirit and scope of the novel concepts thereof.

I claim as my invention:

1. In a thermally operated fluid regulating valve, an elongated tubular valve housing having an inlet at one end thereof and an outlet from the opposite end thereof, a retainer within said housing having a base extending across said housing adjacent the outlet end thereof and having an orifice member carried by said base having an orifice leading therethrough, said retainer having spaced stakes extending along said housing, a thermal-sensitive element engaging said stakes and guided thereby for limited bodily slidable movement therealong, a valve member closely fitting within said stakes to be guided for slidable movement along said stakes and having a metering valve cooperating with said orifice to vary the flow area thereof, a spring seated on said base and maintaining said valve member in engagement with said thermal-sensitive element, and a second spring on the opposite side of said thermal-sensitive element from said first spring forming a relatively solid abutment member for said thermal-sensitive element and yielding upon overtravel thereof.

2. In a thermally operated fluid regulating valve, an elongated tubular valve housing having an inlet at one end thereof and an outlet from the opposite end thereof, a retainer within said housing having a base extending thereacross adjacent the outlet end thereof and having spaced stakes extending from said base along said housing toward the inlet end thereof, an orifice member carried by said base having a contoured orifice leading therethrough, a thermal-sensitive element having a cylindrical casing engaging said stakes and spaced from the interior wall of said housing by said stakes and guided by said stakes for limited bodily movement therealong, flexible metal diaphragms closing opposite ends of said casing and retaining a fusible thermally expansible material thereto, an abutment member engaging one of said diaphragms, an overtravel spring yieldably maintaining said abutment member in engagement with its associated diaphragm, a valve member engaging the opposite diaphragm from said abutment member, means guiding said valve member for movement along said stakes, and spring means biasing said valve member in engagement with its associated diaphragm, said valve member having a contoured face cooperating with said orifice and movable to restrict the flow area of said orifice by said thermal-sensitive element upon predetermined increases in temperature.

3. A thermally responsive flow regulating valve comprising an elongated tubular housing having an inlet at one end thereof and an outlet at the opposite end thereof, a retainer cage within said housing having a base extending across said housing and having an orifice member carried by said case having a contoured orifice leading therethrough coaxial with the center of said housing, said retainer having spaced stakes extending from said base along the wall of said housing, a thermal-sensitive element having a cylindrical casing guided by said stakes for limited bodily movement therealong, said thermal-sensitive element having flexible metal diaphragms closing opposite ends thereof and retaining the thermally responsive material within said casing, a valve member engaging one of said diaphragms and guided for movement along said stakes in axial alignment with said orifice, said valve member having a contoured metering face extending within said orifice for varying the flow area of said orifice upon predetermined variations in temperature, a spring biasing said valve member into engagement with its associated diaphragm, stops on said stakes limiting slidable movement of said thermal-sensitive element toward said inlet, a reaction member engaging the opposite diaphragm from said valve member, and an overtravel spring means maintaining said abutment member into engagement with its associated diaphragm and yielding upon overtravel of said diaphragm.

4. A thermally responsive flow regulating valve comprising an elongated tubular housing having an inlet at one end thereof and an outlet at the opposite end thereof, a retainer cage within said housing having a base extending thereacross adjacent the outlet end thereof and having spaced stakes extending from said base along said housing toward the inlet end thereof, an orifice member carried by said base and having a contoured orifice leading therethrough in axial alignment with the center of said tubular housing, a thermal-sensitive element spaced from the interior wall of said housing by said stakes and slidably guided for limited movement along said stakes, said thermal-sensitive element having a cylindrical casing in engagement with said stakes and flexible metal diaphragms closing opposite ends thereof and retaining a fusible thermally responsive material within said casing, a guide disk interposed between said thermal element and orifice member and guided for movement along said stakes, a valve carried by said guide disk and having cooperation with said orifice to vary the flow area therethrough upon predetermined increases in temperature, a spring seated on the base of said retainer end engaging said guide disk and biasing said valve into engagement with one of said diaphragms, stop means on said stakes limiting movement of said thermal-sensitive element toward the inlet of said valve, a disk on the opposite side of said stop means from said thermal element and having an abutment member engaging a diaphragm opposite from said valve member, and an overtravel spring seated at one end in said stakes and maintaining said guide disk into engagement with said stop means to maintain said abutment member as a solid reaction member for said thermal-sensitive element and yield upon overtravel of said thermal-sensitive element.

References Cited in the file of this patent

UNITED STATES PATENTS

| | | |
|---|---|---|
| 353,186 | Westinghouse et al. | Nov. 23, 1886 |
| 432,269 | Hall | July 15, 1890 |
| 1,646,686 | Crosby | Oct. 25, 1927 |
| 1,952,198 | Findley | Mar. 27, 1934 |
| 2,532,896 | Dillman | Dec. 5, 1950 |